US007130910B2

(12) United States Patent
Urien

(10) Patent No.: US 7,130,910 B2
(45) Date of Patent: *Oct. 31, 2006

(54) METHOD FOR HIGH RATE DATA FLOW TRANSMISSION ON AN INTERNET-TYPE NETWORK BETWEEN A SERVER AND A SMARTCARD TERMINAL, IN PARTICULAR A MULTIMEDIA DATA FLOW

(75) Inventor: Pascal Urien, Villepreux (FR)

(73) Assignee: CP8 Technologies, Paris (FR)

( * ) Notice: Subject to any disclaimer, the term of this patent is extended or adjusted under 35 U.S.C. 154(b) by 1001 days.

This patent is subject to a terminal disclaimer.

(21) Appl. No.: 09/958,725

(22) PCT Filed: Feb. 9, 2001

(86) PCT No.: PCT/FR01/00394

§ 371 (c)(1),
(2), (4) Date: Oct. 10, 2001

(87) PCT Pub. No.: WO01/60040

PCT Pub. Date: Aug. 16, 2001

(65) Prior Publication Data

US 2002/0138549 A1    Sep. 26, 2002

(30) Foreign Application Priority Data

Feb. 10, 2000    (FR) .................................. 00 01665

(51) Int. Cl.
G06F 15/16    (2006.01)
G06F 15/173   (2006.01)
G06F 9/44     (2006.01)
G06F 9/445    (2006.01)

(52) U.S. Cl. ...................... 709/227; 709/217; 709/223; 709/231; 717/173; 717/176

(58) Field of Classification Search ................ 709/217, 709/227, 223, 231, 230, 233; 717/171–173, 717/17

See application file for complete search history.

(56) References Cited

U.S. PATENT DOCUMENTS 5,761,309 A * 6/1998 Ohashi et al. ............... 713/156

(Continued)

FOREIGN PATENT DOCUMENTS

GB    2 326 010 A    12/1998

(Continued)

*Primary Examiner*—Bunjob Jaroenchonwanit
*Assistant Examiner*—Ramsey Refai
(74) *Attorney, Agent, or Firm*—Miles & Stockbridge P.C.; Edward J. Kondracki

(57) ABSTRACT

The invention relates to a method for high-speed data stream transmission to an Internet-type network (RI) between a remote server (4) and a smart card terminal (1). The terminal and the card each include a specific transmission protocol layer (13, 23a). These layers include two intelligent agents ($T_2$, $T_1$, $S_2$, $S_1$), one being a server and the other being a client. The intelligent agents ($T_2$, $T_1$, $S_2$, $S_1$) enable the establishment of bidirectional data exchange sessions. The card then has the function of a client/web server. A filter (28) cooperates with the intelligent agents ($T_2$, $T_1$, $S_2$, $S_1$) to form a "proxy"-type function (27) implanted directly in the card. The data stream includes critical data that pass through the card and opaque data that pass directly to the terminal (1) under the control of the filter (28).

Application in particular to multimedia data streams.

17 Claims, 6 Drawing Sheets

U.S. PATENT DOCUMENTS 6,282,522 B1 * 8/2001 Davis et al. .................. 705/41
6,438,550 B1 * 8/2002 Doyle et al. .................... 707/9
6,547,150 B1 * 4/2003 Deo et al. .................. 235/492

FOREIGN PATENT DOCUMENTS

GB         2 332 288 A    6/1999
WO    WO 98 19237 A    5/1998

\* cited by examiner

METHOD FOR HIGH RATE DATA FLOW TRANSMISSION ON AN INTERNET-TYPE NETWORK BETWEEN A SERVER AND A SMARTCARD TERMINAL, IN PARTICULAR A MULTIMEDIA DATA FLOW

The subject matter of this invention is related to application Ser. No. 09/958,724, filed Oct. 10, 2001, in the name of Pascal Urien, entitled "Method for Listing a User in a Directory Server of an Internet-Type Network and/or Locating a User in This Network, and Smart Card for Performing the Method" and assigned to the assignee of the present invention; U.S. Pat. No. 6,735,627, issued May 11, 2004, in the name of Pascal Urien, entitled "Method for Managing Transmissions of Multimedia Data Via an Internet-Type Network, in Particular Telephone or Videophone Data, and Smart Card for Implementing the Method" and assigned to the assignee of the present invention; application Ser. No. 09/958,226, filed Oct. 10, 2001, in the names of Main Boudou, Pascal Urien and Christoph Siegelin, entitled "Method for Loading a Piece of Software in a Smart Card, in Particular of the Type Known as an 'Applet'" and assigned to the assignee of the present invention. The subject matter of said applications is hereby incorporated by reference.

FIELD OF THE INVENTION

The invention relates to a method for high-speed data stream transmission to an Internet-type network between a server and a smart card terminal.

The invention applies more particularly to a safeguarded multimedia data stream.

DESCRIPTION OF RELATED ART

Within the scope of the invention, the term "high speed" relates to data streams whose rate is typically on the order of 100 kbit/sec or more. By way of example, an audio data file encoded in MP3 requires a memory space of one MO for one minute of recording, or approximately 100 kbit/sec, when this file is transmitted by a digital channel for real-time broadcasting. Video data streams can also be mentioned, which require a transmission speed on the order of 2 MB/sec to be displayed in real time. This is emphatically also the case with what are known as multimedia data streams, which can carry images, video and/or sound all at once.

Within the scope of the invention, the term "smart card terminal" must be understood in a general sense. It can in particular comprise a personal computer using various operating systems, such as Windows or UNIX (both of which are registered trademarks). It can also be a workstation or a portable computer.

Also within the scope of the invention, the term "Internet network" or "Internet" includes not only the Internet per se but private business networks or the like of the type known as "intranet", and networks that extend them to the outside, known as "extranet", and in general any network in which data exchanges are performed by an Internet-type protocol.

To define the concepts, the following description of the preferred application of the invention will be made, without limiting the scope of the invention per se, in terms of transmitting a safeguarded multimedia data stream, unless otherwise noted.

The term "safeguarded" is understood to mean that the data in question are encrypted entirely or in part to assure confidentiality, or at least so that they cannot be freely accessed. In certain cases, this may mean data for payment access. In all cases, it is in general necessary to furnish identification data (password, identifier or "login", credit card number, and so forth) that enable a transaction with a view to obtaining desired data (multimedia file, for instance). These data are known to be sensitive and cannot be transmitted in the clear over the Internet. Hence they must be safeguarded: encryption or use of a safeguarded protocol, such as SSL (for Secure Socket Layer).

Given the very rapid development of the Internet, a first need is to know how to transmit all sorts of digital files via this network, from or to various server and/or client systems. When the bandwidth of the transmission path or part of this transmission path connecting the systems is low (for example, telephone lines of the switched type are limited to about 56 kbits per second, using the V90 standard), high-volume files can indeed be transmitted over these transmission lines but cannot be used in the majority of cases except after complete remote downloading, but not in real time. The availability of high-speed communication paths (Integrated Service Digital Network or ISDN, cable, or satellite links) makes it possible to contemplate real-time broadcasting of audio files or even multimedia files via a terminal connected to the Internet. Even a conventional telephone line, using ASDL, a new transmission technology, can transmit digital data at a speed on the order of 1 megabit per second.

Historically, the transmission channel between a remote server and a terminal, both of them connected to the Internet, was a bottleneck. It is quite clear that information processing systems at both ends of the chain, that is, servers and terminals, can handle data outputs required for a transmission and/or processing and broadcasting of multimedia files. The recent implementation of high-speed paths over the Internet thus allows this type of "end to end" processing.

Another need is to know how to use smart cards in association with the terminals.

In fact, in a smart card-based applications system, the smart card can be considered to perform various functions, and especially security functions. It is advantageous to store the data associated with security (passwords, access rights, and so forth) in a smart card that can be kept by the user. Furthermore, the data, recorded in a read-only memory in a form that can be encrypted and thus cannot be easily modified or read directly from outside.

In payment transactions, similar functions are implemented. It is also necessary, as noted above, for passwords and/or identifiers as well as various sensitive data (bank card number, etc.) and data defining the rights of a user (subscriptions in force, accessible services, etc.) to be transmitted.

However, it should be noted that in the prior art, the security function cannot be embodied directly inside the smart card, because the stream of data received and/or transmitted does not pass through the smart card. Hence a dialog must be established between the terminal and the smart card, so that controls associated with security can be performed. This mode of operation degrades the level of security and even allows "Trojan horses" to be introduced into the terminal, under certain unfavorable conditions. Hence it would be necessary for the security controls to be done in situ, that is, in the smart card itself, which would require the data stream to be rerouted via the smart card before being transmitted to the terminal.

Over and above the security function that has fallen to it, it would also be valuable for the smart card to be capable of directly controlling certain operations that are executed in the terminal and for example to be capable of modifying predetermined characteristics of data received and/or transmitted via the terminal.

In the prior art, these modes of operation are incompatible with currently available technologies and with the standards made for smart card-based applications, as will be seen hereinafter.

First, the general architecture of a smart card-based applications system will be reviewed briefly, with reference to FIGS. 1A and 1B.

A smart card-based applications system can generally include the following main elements:

a smart card;

a host system comprising the aforementioned terminal;

a communications network, that is, the Internet in the preferred application;

and an applications server connected to the Internet.

FIG. 1A schematically illustrates one example of this type of architecture. The terminal 1, such as an individual computer, includes a reader 3 for a smart card 2. This reader 3 may or may not be physically integrated with the terminal 1. The smart card 2 includes an integrated circuit 20 whose input/output connections are flush with the surface of its substrate, to allow a supply of electrical energy and communications with the terminal 1. This terminal includes circuits 11 for access to the Internet RI. These circuits can be constituted by a modem for connection to a switched telephone line, or in the case of the invention, preferably a higher-speed communication path, such as the Integrated Service Digital Network (ISDN), cable, or satellite links. The circuits 11 enable connection to the Internet RI, either directly or via an Internet service provider (ISP). Recourse can also be had to an intermediate system such as a proxy or an insulation system known as a firewall (or guard barrier).

The terminal 1 naturally includes all the circuits and devices necessary for its proper functioning, which have not been shown for the sake of simplifying the drawing: a CPU, random access and read-only memories, magnetic disk mass memory, disk drive and/or CD-ROM drive, and so forth.

Typically, the terminal 1 is also connected to conventional peripherals, either integrated or not, such as a display screen 5a and a sound reproduction system 5b (allowing the broadcasting of multimedia files within the scope of the invention), a keyboard 6a and a mouse 6b, and so forth.

The terminal 1 can be put into communication with servers or any information processing systems connected to the network RI, of which a single server 4 is shown in FIG. 1A. The access circuits 11 put the terminal 1 into communication with the servers 4 using a particular software 10, called a web navigator or browser. This enables access to various applications or data files that are distributed over the entire network RI, generally by a client-server mode, and in particular enables access to multimedia files.

Typically, communications over the networks are done in accordance with protocols that meet standards including a plurality of superimposed software layers. In the case of an Internet-type network RI, the communications are done according to protocols specific to this type of communications, which will be described in detail hereinafter, but which also include a plurality of software layers. The communication protocol is selected as a function of the particular application contemplated, such as looking up web pages, transferring files, electronic mail (or e-mail), forms, news, etc.

The software architecture of the system including a terminal, a smart card reader and a smart card, is shown schematically in FIG. 1B. It is described by ISO standard 7816, which in turn includes several subsets:

ISO 7816-1 and 7816-2, pertaining to the dimensions and marking of cards;

ISO 7816-3, pertaining to the transfer of data between the terminal and the smart card; and ISO 7816-4, pertaining to the structure of the set of orders and the format of commands.

In FIG. 1B, for terminal 1, only the layers meeting ISO standard 7816-3, identified by reference numeral 101, and an APDU order manager (ISO 7816-4), reference numeral 102 are shown. For the smart card 2, the layers meeting ISO 7816-3 are identified by reference numeral 201, and the APDU order manager (ISO 7816-4) has reference numeral 210. The applications carry reference symbols $A_1, \ldots A_i, \ldots A_n$, where n is the maximum number of applications present in the smart card 2.

A "cardlet" (registered trademark) application $A_i$ in the smart card 2 (FIG. 1A) conducts a dialog with the terminal 1 by means of a set of orders. This set typically has writing and reading orders. The order format is known by the abbreviation APDU ("Application Protocol Data Unit"). It is defined by the aforementioned ISO standard 7816-4. A command APDU is written as "APDU.command", and a response APDU is written "APDU.response". The APDUs are exchanged between the card reader and the smart card by means of a protocol specified by the aforementioned ISO standard 7816-3 (for example, in the character mode: T=0; or in the block mode: T=1).

When the smart card 2 includes a plurality of distinct applications, as illustrated by FIG. 1B, it is called a multi-application card. However, the terminal 1 is in a dialog with only one application at a time. An application $A_i$ is present for example in the form of a piece of software called an "applet", in the JAVA language (JAVA is a registered trademark) and will hereinafter be called a cardlet. The selection of a particular cardlet $A_i$ is obtained with the aid of an APDU of the selection type ("SELECT"). Once this choice has been made, the APDUs that follow are routed through the cardlet. A new "APDU SELECT" causes the current application to be abandoned so that another one is then chosen. The software manager subset of the APDUs 210 makes it possible to choose a particular application $A_i$ in the smart card 2, to memorize the application thus chosen, and to transmit and/or receive APDUs to and from this application.

To summarize what has just been described, the selection of an application $A_i$ and dialog with it are done by exchanges of APDU orders. Let it be assumed that the applications $A_i$ are conventional applications, hereinafter called GCAs (for Generic Card Application).

Given the above review, it should be noted that the smart card 2 cannot communicate directly with standard commercial navigators except by modifying their code.

Furthermore and above all, current smart cards, which moreover meet the standards described above, have a hardware and software configuration that no longer allows them to communicate directly with the Internet. In particular, they cannot receive and transmit data packets by one or the other of the protocols used in this type of network. Hence it is necessary to provide an additional piece of software, implanted in the terminal 1, generally in the form known as a "plug-in". This piece of software, which is identified by reference numeral 12 in FIG. 1A, acts as the interface between the navigator 10 and the card 2, and more specifically the electronic circuits 20 in this card 2.

It is also clear that given the rapid development of technologies in the past and their foreseeable development in the future, the capacity for recording information in memory circuits, either random access or read-only, of a smart card has been and remains quite limited, compared to the capacity offered by a "host" terminal for this smart card, and naturally the capacities offered by larger systems, minicomputers, or very large systems of the mainframe type. Nor is it possible to store high-volume data files in the smart card, especially files of the multimedia type. It would thus be necessary, while allowing the possibility of having the smart card communicate with the Internet and have data sent through it (which the prior art does not allow, as reviewed above), to perform all the necessary processing operations "on the fly", that is, without storing them in memory, even temporarily. The calculation power of logic circuits, and especially of the microprocessor, in the smart card does not allow such a mode of operation in the state of the art, or in the foreseeable near future.

Finally, the aforementioned standards organize communications between a smart card and a terminal via the serial-type reader. What is more, the speeds allowed by current technology is quite low, on the order of from 1 to 10 kbits per second, which once again is incompatible with the rates contemplated (100 kbits per second at minimum) in the context of the applications according to the invention.

SUMMARY OF THE INVENTION

The invention seeks to overcome the disadvantages of the methods and apparatus of in the prior art, some of which have just been reviewed above, while responding to felt needs, that is, in particular to be capable of handling high-speed data streams while enjoying maximum security.

In a first characteristic of the invention, the smart card behaves like a web-type server-client with regard to the terminal with which it is associated.

To do so, a specific communication protocol layer is provided in the smart card and its counterpart in the terminal. The term "specific" must be understood to mean specific to the method of the invention. In fact, these communication layers, called specific communication layers, are non-specialized, regardless of the application in question. They act only in the process of bidirectional data exchanges between the smart card and the terminal on the one hand, and the smart card and the network, on the other.

The specific communication software layer, known as "intelligent agents", which make it possible in particular to convert protocols. The intelligent agents will hereinafter be called simply "agents". There are matched agents in the specific communication layers assigned to the terminal and the smart card, respectively. By the method of the invention, sessions between matched agents are established.

These arrangements make it possible in particular to reroute all or part of the data stream from or to the Internet via the smart card, while still meeting the aforementioned ISO standards for communications between a smart card and a terminal via the reader.

In another characteristic of the invention, a particular application, which will be called a "filter" hereinafter, is implanted in the smart card. This is a software entity that plays a role similar to that of a proxy. To do so, the aforementioned arrangements implementing agents are used. This proxy makes it possible to perform processing operations on security-linked data directly in the smart card.

In another characteristic of the invention, a disymmetrical communication protocol is implanted. According to this characteristic, the data stream being output or received is subdivided into two components: a first, low-speed stream representing a low volume of data that will hereinafter be called "critical data stream", which passes directly via the smart card, and a high-speed stream representing a large volume of data, hereinafter called the "opaque data stream", which passes via the terminal.

In the preferred applications of the invention, the critical data stream is made up of security data that can be addressed to the aforementioned proxy of the smart card in order to be processed there secretly. The opaque data are made up of the multimedia data per se. These data are processed by agents located in the terminal. However, the authorization to receive opaque data and process them is subordinate to the outcome of an authentication procedure initiated by the security data in the smart card. Because of the presence of the aforementioned filter, the reception of data by the terminal remains under the direct control of the smart card.

The opaque data passing through the terminal can also undergo particular processing operations in this terminal before being effectively used, under the command and control of the smart card, or in other words definitively of the critical data that the smart card has received.

To this end, particular additional agents, which will be called "protocol agents" located in the smart card and the terminal, or in only one of these devices, are provided.

Hence the principal subject of the invention is a method for transmitting a data stream, via a network of the Internet type, between at least one remote server and a terminal provided with a smart card reader, said terminal including at least one application of the TCP/IP client type, said terminal and said server both being connected to said Internet-type network, characterized in that it includes at least the following phases:

a) a first phase, comprising implanting a first piece of software, forming a specific communication protocol layer, into said smart card;

b) a second phase, consisting of implanting a second piece of software, forming a specific communication protocol layer and forming an interface with at least said application of the TCP/IP type, into said terminal;

that said first and second pieces of software each furthermore include at least one first autonomous software entity of the client type and one second autonomous software entity of the server type, said entities cooperating in such a way as to enable the establishment of bidirectional data exchange sessions between said terminal and said smart card and in such a way that said smart card offers the functions of a client/web server, and to enable the establishment of a bidirectional data exchange session between said terminal and one of said remote servers, via said Internet-type network, said autonomous software entities communicating by means of predetermined protocol data units;

that it includes a phase of embodying, in said smart card, a piece of applications software of predetermined functional characteristics known as a "filter", receiving and/or outputting protocol data units to and/or from said first and second autonomous software entities of the client and server types, respectively, that are included in said second specific piece of software, the embodiment of said piece of applications software piece being under the control of said server-type autonomous software entity;

and that said filter cooperates with said autonomous software entities of said second specific piece of software to open a session with said autonomous software entities of said first specific piece of software in order to modify the predetermined characteristics of said data stream transmitted between said terminal and said remote server.

BRIEF DESCRIPTION OF THE DRAWINGS

The invention will now be described in further detail in conjunction with the accompanying drawings, in which.

DESCRIPTION OF THE PREFERRED EMBODIMENTS(S)

Figure 1A:
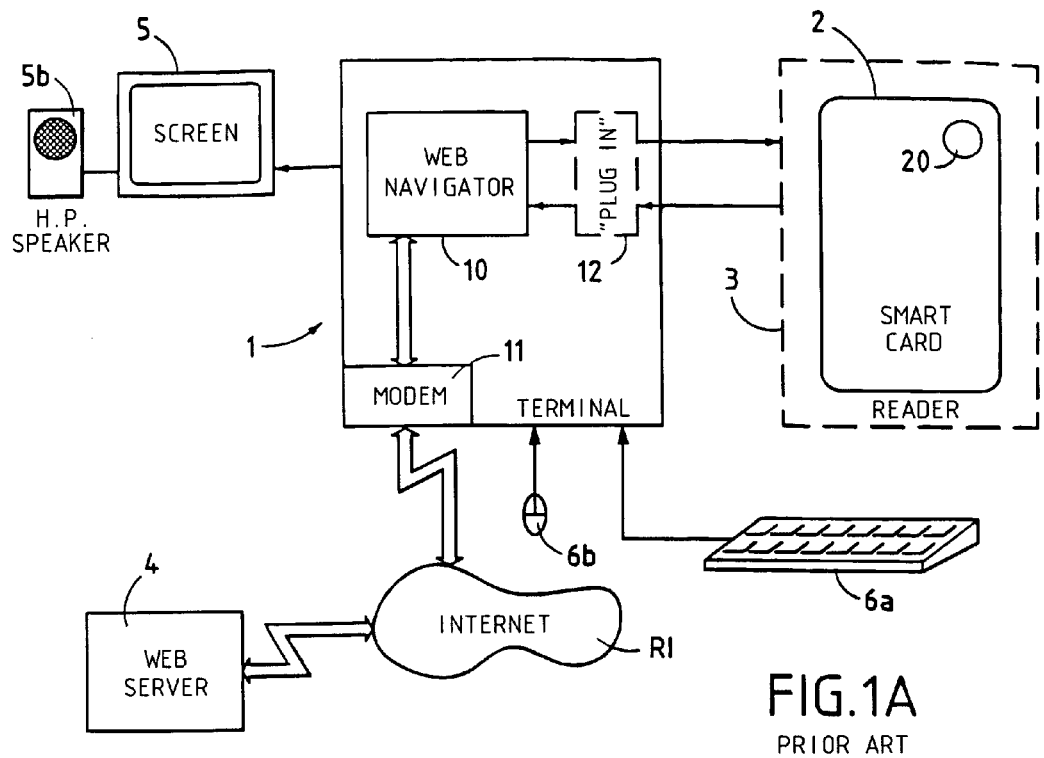
FIGS. 1A and 1B schematically illustrate the hardware and software architectures, respectively, of one example of a smart card-based applications system according to the prior art.
Figure 1B:
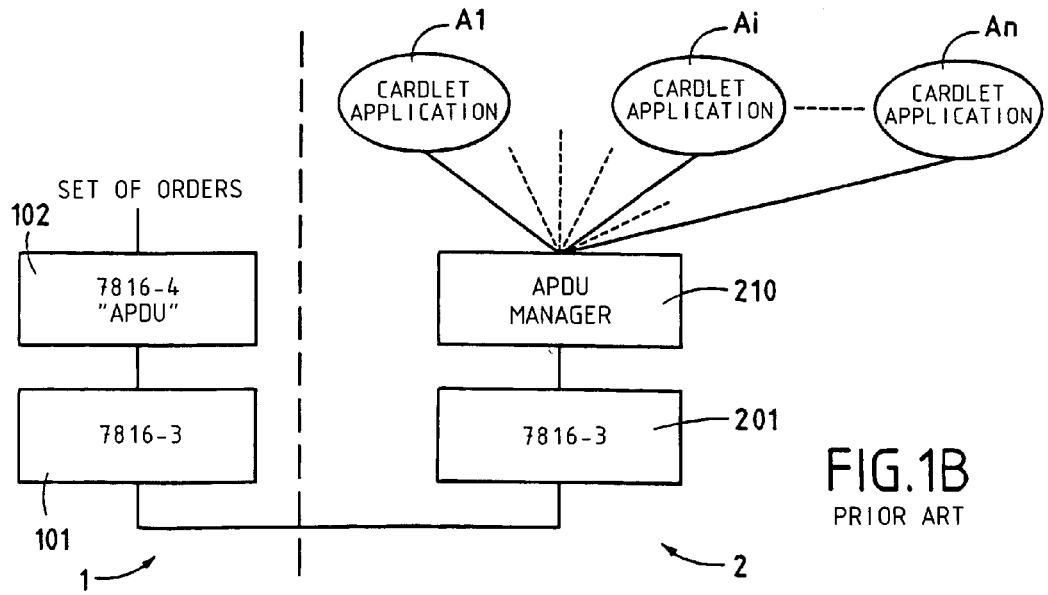

In the following description, without in any way limiting the scope, the context will be of a preferred application of the invention, which unless otherwise noted pertains to a multimedia stream safeguarded by a proxy implanted in a smart card cooperating with a terminal connected to the Internet, where web servers are also connected to the Internet.

Before the method of activating applications located in a smart card according to the invention is described and an architecture for implementing it is described in detail with reference to FIG. 2, it is appropriate first to review briefly the main characteristics of communication protocols in these networks.

The architecture of communication networks is described by various layers. By way of example, the OSI standard (for Open System Interconnection) defined by the ISO includes seven layers, which range from what are known as lower layers (such as the "physical" layer, which involves the physical transmission substrate) to what are known as high, or upper, layers (such as the "application" layer), passing through intermediate layers, especially the "transport" layer. A given layer offers its services to the layer that is immediately above it, and requests other services, via suitable interfaces, from the layer that is immediately below it. The layers communicate with the aid of primitives. They can also communicate with layers of the same level. In certain architectures, various layers may not be present.

In an environment of the Internet type, the layers are five in number, and more precisely, ranging from the highest to the lowest layer, they are: the application layer ("http", "ftp", "e-mail", etc.), the transport layer ("TCP"), the network addressing layer ("IP"), the data link layer ("PPP", "Slip", etc.), and the physical layer.

With the exception of specific communication protocol software layers 13 and 23a, implanted in the terminal 1 and the smart card 2a, respectively, the other hardware or software elements are common to the prior art, and there is no need to describe them again here in detail.

The terminal 1 includes circuits 11 for access to the network RI, the circuits being constituted by a modem, for example. These circuits include the lower software layers $C_1$ and $C_2$, which correspond to the physical and data link layers.

Also shown are the upper layers $C_3$ and $C_4$, which correspond to the network addressing (IP, in the case of the Internet) and transport (TCP) layers. The upper application layer ("http", "ftp", "e-mail", etc.) has not been shown.

The interface between the lower layers $C_1$ and $C_2$ and the upper layers $C_3$ and $C_4$ is made up of a software layer, generally called a "low layer driver". The upper layers $C_3$ and $C_4$ rest on this interface and are implemented by way of specific function libraries or network libraries 14, with which they correspond. In the case of the Internet, TCP/IP is implemented by means of what are known as "socket" libraries.

This organization enables a navigator 10 to make requests of a server 4 to consult web pages ("http" protocol) to transport files ("FTP" protocol) or to send electronic mail ("email" protocol), in an entirely classical fashion.

The terminal 1 also includes a card reader 3, which may or may not be integrated. For communication with the smart card 2a, the card reader 3 also includes two low layers $CC_1$ (physical layer) and $CC_2$ (data link layer), which play a role similar to the layers $C_1$ and $C_2$. The software interfaces with the layers $CC_1$ and $CC_2$ are described for example by the PC/SC specification (part 6, service provider). The layers themselves, $CC_1$ and $CC_2$, are described in particular by ISO standards 7816-1 through 7816-4, as has been noted above.

An additional software layer 16 forms an interface between the application layers (not shown) and the lower layers $CC_1$ and $CC_2$. The main function assigned to this layer 16 is that of multiplexing/demultiplexing.

Communications with the smart card 2a are done by a paradigm similar to that used to manipulate files in an operating system of the UNIX type (UNIX is a registered trademark): OPEN, READ, WRITE, CLOSE, etc.

A similar organization is found in the smart card 2a, that is, the presence of two low layers, $CCa_1$ (physical layer) and $CCa_2$ (data link layer), as well as an interface layer 26a, which is entirely similar to the layer 16.

In a first characteristic of the invention, two specific protocol layers 13 and 23a, respectively, are provided on one hand and other, that is, in the terminal and in the smart card 2a.

In the terminal 1, the specific layer 13 interfaces with "low layer drivers" 15, libraries 14 of network layers $C_3$ and $C_4$, and protocol layers for the card reader 3, that is, the lower layers $CC_1$ and $CC_2$, via the multiplexing layer 16. The specific layer 13 enables the transfer of network packets from and to the smart card 2a. It also adapts the existing applications, such as the Internet navigator or surfer 10, e-mail, etc., for uses that employ the smart card 2a.

In the smart card 2a, quite a similar organization is found, with an additional instance of the specific layer 23a, which is the counterpart of the layer 13.

More precisely, the specific layers 13 and 23a are subdivided into three main software elements:

a module 130 or 130a for transferring blocks of information between the layers 13 and 23a, via the conventional layers $CC_1$, $CC_2$, $CCa_1$, and $CCa_2$;

one or more pieces of software, called intelligent agents, 132 or 232a, which by way of example embody protocol conversion functions;

and a specific configuration management module 131 and 231a, respectively, which module can be likened to a particular intelligent agent.

For the sake of simplicity, these intelligent agents will be called simply agents hereinafter, as noted above.

In the terminal 1 and the smart card 2a, a communication protocol stack is found between the two entities.

The layers at level two (data link layers) $CC_2$ and $CCa_2$ assure the exchange between the smart card 2a and the terminal 1. These layers are responsible for detecting and as needed correcting transmission errors. Various protocols can be used, and by way of a non-exhaustive example, the following:

the recommendation ETSI GSM 11.1;

the protocol defined by ISO 7816-3, in character mode T=0;

the protocol defined by ISO 7816-3, in block mode T=1;

or the protocol defined by ISO standard 3309, in HDLC (High-level Data Link Control procedure) frame mode.

Within the scope of the invention, the ISO 7816-3 protocol in block mode will preferably be used.

In a manner known per se, a certain number of primitives is assigned to each protocol layer; they enable the exchanges of data between layers of the same level and from one layer to the other. By way of example, the primitives assigned to the level 2 layer are of the "data request" ("Data.request") and "send data" ("Data.response") by the card as well as "confirmation of data" ("Data.confirm"), etc.

More specifically, the layers 13 and 23a are tasked with dialog between the smart card 2a and the host, that is, the terminal 1. These layers enable the exchange of information between a user (not shown) of the terminal 1 and the smart card 2a, for example by way of scrolling menus in the form of hypertext in the HTML format. They also allow the installation of a configuration adapted for the transmission and/or reception of data packets.

As indicated above, the layers include three distinct entities.

The first layer 130 or 230a essentially comprises a software multiplexer. It enables the exchange of information between the smart card 2a and the host terminal 1, in the form of protocol data units. It plays a role similar to that of a data packet switcher. These units are sent or received via the layer at level 2 (data link layer). This particular communication protocol makes it possible to put at least one pair of agents into communication. The first agent of each pair, 132, is located in the layer 13 of the terminal 1, while the second agent, 232a, is located in the layer 23a in the smart card 2a. A link between two agents is associated with a session that will be called "S-Agent". A session is a bidirectional data exchange between these two agents. If one or the other of the layers 13 and 23a includes a plurality of agents, then the agents of the same layer can also establish sessions between them and/or with the modules 131 and 23 1a that constitute the particular agents.

More precisely, an agent is an autonomous software entity, which can embody all or some of the functions of layers at levels 3 and 4, depending on the configuration implemented by the terminal 1.

These agents are assigned particular properties or attributes. To define the concepts, and by way of non-limiting examples, the following six properties are assigned to the agents:

"host": agent located in the terminal;

"card": agent located in the smart card;

"local": agent not communicating with the network;

"network": agent communicating with the network (in the terminal);

"client": agent which initializes a session;

"server": agent which receives a session request.

A particular agent is identified by a reference, such as a 16-bit integer (that is, an integer between zero and 65535). The most significant bit (b15=1) tells whether this reference is local (local communications with the smart card or the terminal) or remote (b15=0).

Two large categories of agents exist: the agents of the "server" type, which are identified by a fixed reference, and the agents of the "client" type, which are identified by a variable reference that can also be called ephemeral, issued by the configuration management module 131 or 231a.

The agents communicate with one another by way of entities called protocol data units or pdus, which include a target reference and a source reference. This particular pdu can also be called a "SmartTP pdu", with reference to the currently used term "smart card". In particular, the pdus utilize the references defined above.

A SmartTP pdu, or more simply pdu hereinafter, includes a source reference, a target reference, a set of bits comprising flags, which specify the nature of the pdu, and optional data:

the "OPEN" flag is in place to indicate the opening of a session;

the "CLOSE" flag indicates the closure of a session; and the "BLOCK" flag indicates that the agent is waiting for a response from its correspondent and has suspended all activity.

A pdu that does not include data will be called a token.

The SmartTP entity controls the existence of the target agent and performs the commutation of a packet to it.

An agent session or "S-Agent" has three notable states, specifically:

a disconnected state: no session is open with any other agent;

a connected state: a session is open with another agent, an "S-Agent" session being identified by a pair of references; and a blocked state, where the agent is connected and is waiting for a response from its correspondent.

The mechanism for establishing an "S-Agent" session is as follows:

a new instance of a client agent is created (in the smart card or the terminal), this agent being identified by a pseudo-unique ephemeral reference;

the client agent sends a pdu to a server agent (whose reference is furthermore known) with the "OPEN" flag in place, and the client agent shifts to the connected state or the blocked state, depending on the value of the "BLOCK" flag; and the server agent receives the pdu with the "OPEN" flag and shifts to the connected state.

Once a session is open, two agents exchange data via pdus.

The mechanism for closing a session is as follows:

one agent sends a pdu with the "CLOSE" flag in place (which may possibly include data); and the other agent receives a pdu with the "CLOSE" flag in place (which may possible include data), and the "S-Agent" session shifts to the disconnected state.

Figure 3:
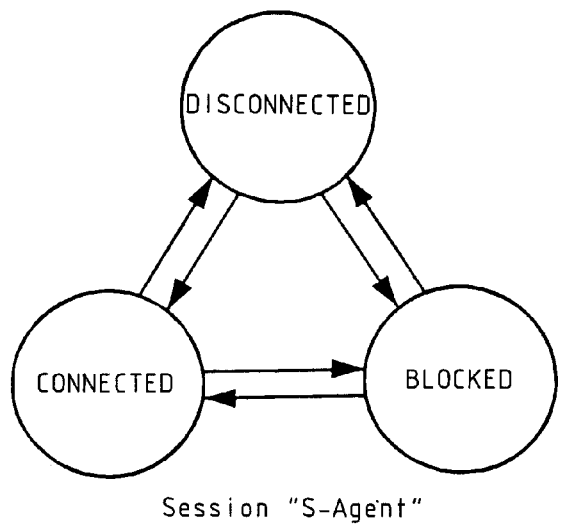
FIG. 3 is a diagram showing states of a session between software entities known as intelligent agents, in one feature of the invention.

FIG. 3 schematically illustrates the diagram of states of "S-Agent" sessions, such as have just been described.

The layers 130 and 230a manage tables (not shown) that contain the list of agents present, in the host terminal 1 and the smart card 2a.

In practical terms, the agents enable an exchange of data (in hypertext, for example), but also enable launching network transactions.

The configuration management modules, 131 and 231a, respectively, are similar to particular agents. For example, the module 131 in the host terminal 1 in particular manages information relating to the configuration of this terminal (modes of operation), lists other agents present, and so forth. The module 231a in the smart card 2a has analogous functions. These two agents can be put into communication with one another in order to establish a session.

In a first characteristic of the invention, the smart card 2a behaves like a client/web server.

In practical terms, the smart card 2a is advantageously "addressed" by using a URL (for universal resource locator) that defines a feedback loopto the terminal 1 itself, rather than pointing to an external server. By way of example, the structure of this URL is typically as follows:

$$\text{http://127.0.0.1:8080} \tag{1}$$

in which 127.0.0.1 is the feedback loopIP address, and 8080 is the port number.

Figure 2:
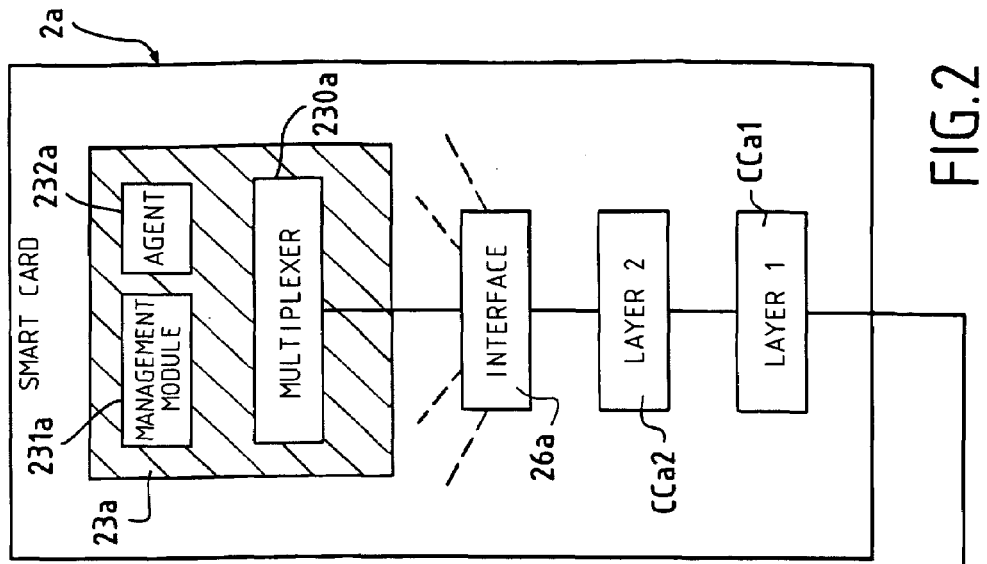
FIG. 2 schematically illustrates one example of a smart card-based applications system according to the invention, the smart card acting as a web server.
Figure 2:
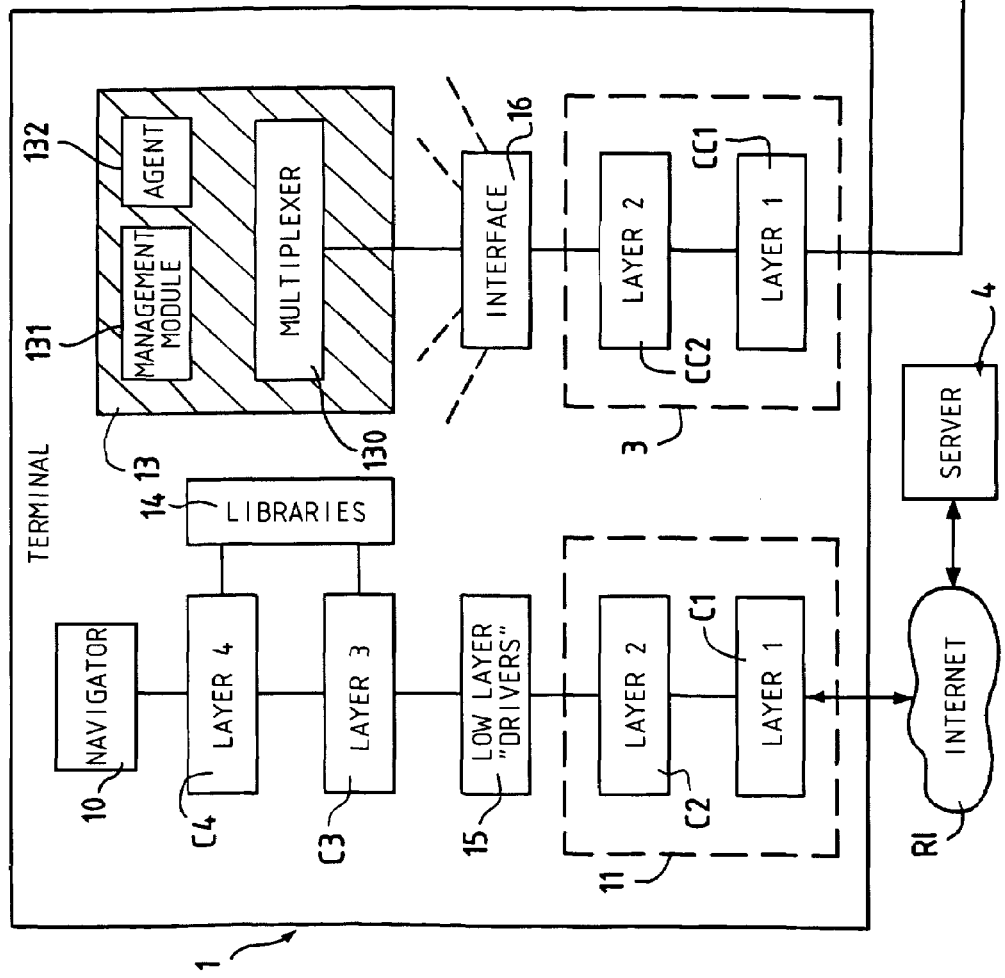
Figure 4:
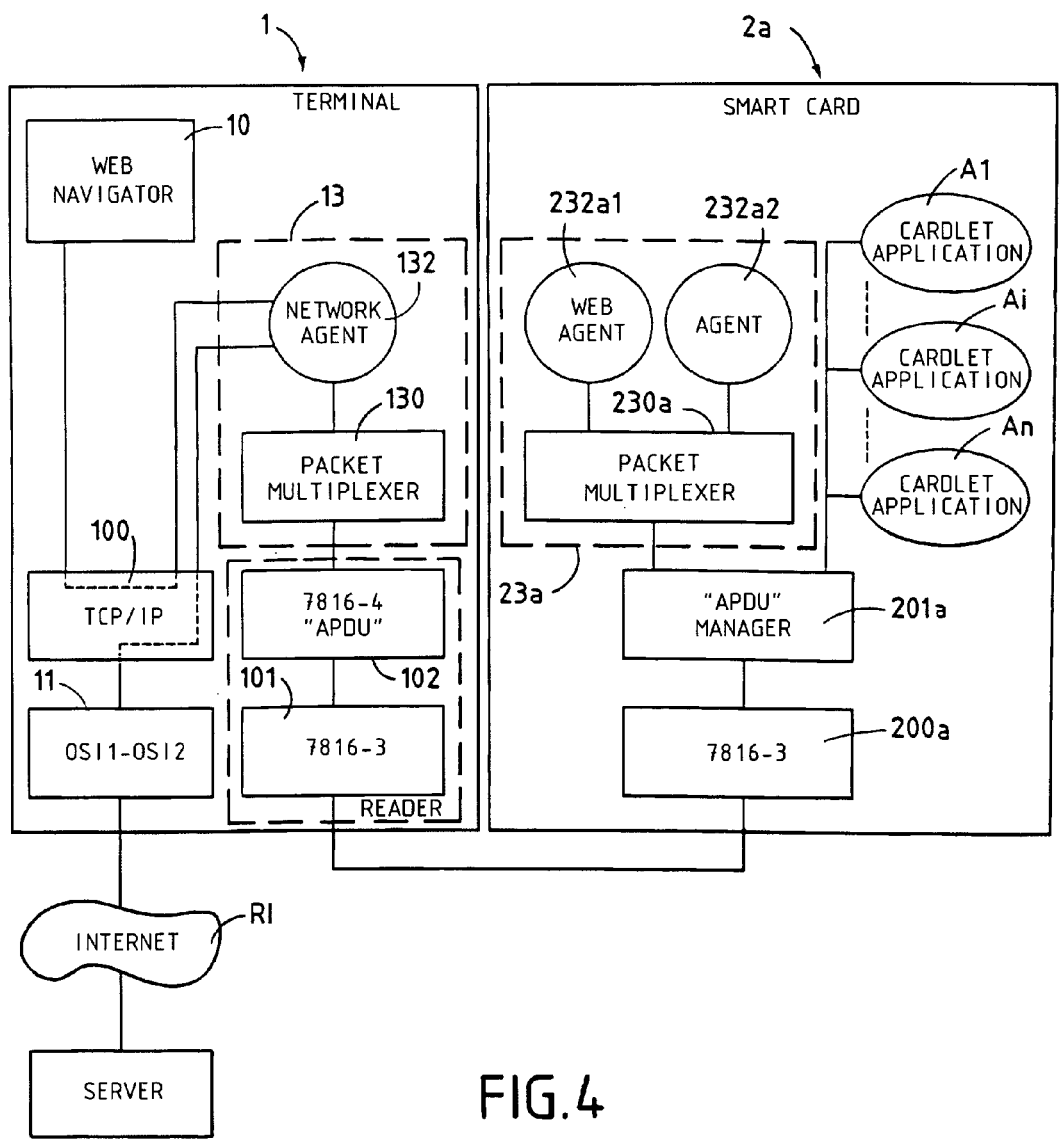
FIG. 4, in simplified fashion, illustrates the software architecture of a system according to the invention in which the smart card includes intelligent agents.

FIG. 4 in simplified fashion shows the software architecture of a system according to the invention, of the type shown in FIG. 2 but now shown in more detail. The smart card 2a includes a plurality of agents, only two of which are shown: an agent $232a_1$ of the web type, and an agent $232a_2$, whose type is not precisely defined. The software stack includes the lower protocol layers 200a, which meet ISO standards 7816-3 (FIG. 2: $CCa_1$ and $CCa_2$), the APDU command manager $201a_1$, and the packet multiplexer 230a, this latter being interfaced with the agents, in particular the web agent $231a_1$.

There are two stacks in the terminal, one communicating with the Internet RI and the other with the smart card 2a. The first stack includes the devices 11 (FIG. 2: $C_1$ and $C_2$) for access to the network (standards OSI 1 and 2), and the TCP/IP protocol layers (FIG. 2: $C_3$ and $C_4$), reference numeral 100. These third layers are interfaced with the web navigator 10. The other stack includes the lower protocol layers 101, which meet ISO standards 7816-3 (FIG. 2: $C_1$ and $C_2$), the APDU order manager 102, and the packet multiplexer 130, this last being interfaced with agents, only one of which, 132, is shown. Assuming that this agent is of the network type, it can furthermore communicate on the one hand the navigator 10, via the TCP/IP layers 100, and on the other with the Internet RI, via these same TCP/IP layers 100 and the device 11 for access to the network RI.

The APDU order manager 201a is also interfaced with one or more applications-level layers, which will simply be called applications. As has been noted, these applications $A_1 \ldots A_i \ldots, A_n$, are application of a conventional type, known as cardlets.

In summary, the client/web server furnished by the smart card 2a can be embodied by association with the web agent $231a_1$ in the smart card and the network agent 132 in the terminal 1, and by implementing sessions between agents, as has been described.

The smart card 2a does indeed have the function of client/web server. In addition, in a characteristic of the method of the invention, any conventional application $A_1$ through $A_n$ of the GCA type mentioned above can be activated through this client/web server, either via the web navigator 10 in the terminal 1 or via a remote navigator 4 located at any point in the Internet RI, by implementing sessions between agents. According to the method of the invention, the applications $A_1$ through $A_n$ do not have to be rewritten and are implemented as is.

In another feature of the invention, by implementing the mechanism of agents as has just been described, a function known as "proxy TCP/IP" is implanted directly in the smart card 2a. This function is embodied by a particular software application, which will hereinafter be called a "filter".

The "proxy" function is well known in the field of Internet applications, but it cannot be implanted in smart cards of systems according to the prior art.

Figure 5:
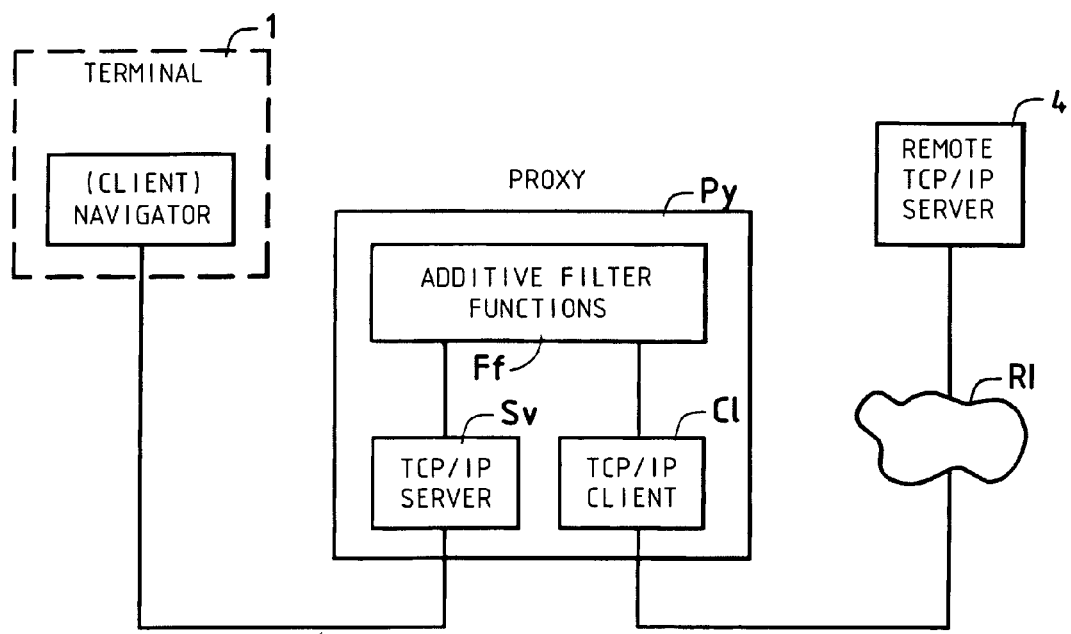
FIG. 5 schematically shows a proxy according to the prior art.

Before an architecture according to the invention is described, the characteristics of a classical proxy according to the prior art will be reviewed briefly, in conjunction with FIG. 5.

In TCP/IP technology, a software entity Py is called a proxy when on the one hand it embodies a TCP/IP server Sv and on the other a TCP/IP client C1. The software entity Py makes a connection between a local client and some other remote TCP/IP server.

A proxy Py usually performs the functions of a filter and/or security functions. For example, an http proxy generally assures the connection of a navigator, such as the navigator 10 of the terminal 1, to a web server 4 in a business (this is known as a firewall). It can also be an SSL proxy, which can be defined as a proxy that is local to the terminal and that performs the requisite security operations (authentication, confidentiality, integrity) for establishing a safeguarded tunnel through the Internet RI.

A software architecture that integrates the proxy function directly in a smart card, in accordance with an additional aspect of the invention, will now be described in conjunction with FIG. 6.

The elements common to the preceding drawing figures have the same reference numerals and will not be described again except as needed. To simplify the description, the agents in the terminal 1 are grouped under the unique reference numeral 132, and those in the smart card 2a are grouped under the unique reference numeral 232a. They will be differentiated hereinafter by the letter "T" for terminal and "S" for smart card, and these letters are assigned index numerals. The proxy 27 embodied on the smart card 2a will be called a "Smart Proxy" hereinafter.

The Smart Proxy 27 is embodied by the association of four agents, that is, two in the terminal 1: $T_1$ and $T_2$, and two in the smart card 2a: $S_1$ and $S_2$, and a filter function 28, as described below:

a "terminal/client/network" agent $T_1$ embodies a TCP/IP server (for example at the port 8080);

a "card/server/local" agent $S_1$ is associated with the agent $T_1$ via a session, and this agent typically performs the functions of a web server;

a filter function 28, which is determined as a function of information originating in the agent $T_1$, is capable of sending or receiving pdus to and from the agents $S_1$ and $S_2$;

a "card/client/local" agent $S_2$, an instance of this agent being created dynamically by the filter function 28; $S_2$ opens a session with the network agent $T_2$, to which it tells the address of the remote Internet server 4 to which S$_2$ seeks to be connected; and an agent "terminal/server/network" T$_2$ embodies the function of a TCP/IP client which is connected to an Internet server 4.

The mechanism for creating the Smart Proxy 27 is described below.

A TCP client, hereinafter called cTCP, typically the web navigator 10, opens a connection with the network agent T$_1$. A session T$_1$-S$_1$ is then created. For example, the following URL:

$$\text{http:}//127.0.0.1\text{:}8080/?\text{des 1=xxx.com:80/yyy/content.html} \qquad (2)$$

causes the opening of a session between the agents T$_1$ and S$_1$.

On the basis of data exchanged by T1 and S1, the application assigned to the agent S1 (a web server) determines which filter function 28 is to be used. Thus "des 1" is the name of a particular filter; "xxx.com" is the arbitrary number of an Internet server, such as the server 4; "80" is a port number; and "/yyy/content.html" is the arbitrary name of a file in this server, for example constituted by a page in HTML language. In the example, the filter "des 1" is a filter making it possible to perform a decryption and/or encryption operation in accordance with an algorithm of the DES (data encryption standard) type.

In other words, the "card" URL (2) encapsulates another URL intended for the outside world; the first part of the card URL is made up of the feedback loopURL as defined by statement (1).

The filter 28 "des 1" creates an instance of client S$_2$; a session is opened between the agents S$_2$ and T$_2$. The data inserted into the first pdu ("pdu OPEN") states the name of the Internet server ("xxx.com") and its assigned port number (80).

The agent T$_2$ opens a connection of the TCP type with the remote server "sTCP" ("zzz.com"). Once this connection has been made, a token is sent, whose destination is S$_2$.

In terms of these exchanges, a Smart Proxy 26 has been created; a filter function 28 that is resident in the smart card 2a is capable of processing the data (originating from the Internet RI) received by the network agents. The filter 28 controls the data output by the network agents T$_1$ and T$_2$, in a logical way. It behaves like a proxy TCP that controls the data exchanged between the client cTCP and the server sTCP.

Figure 6:
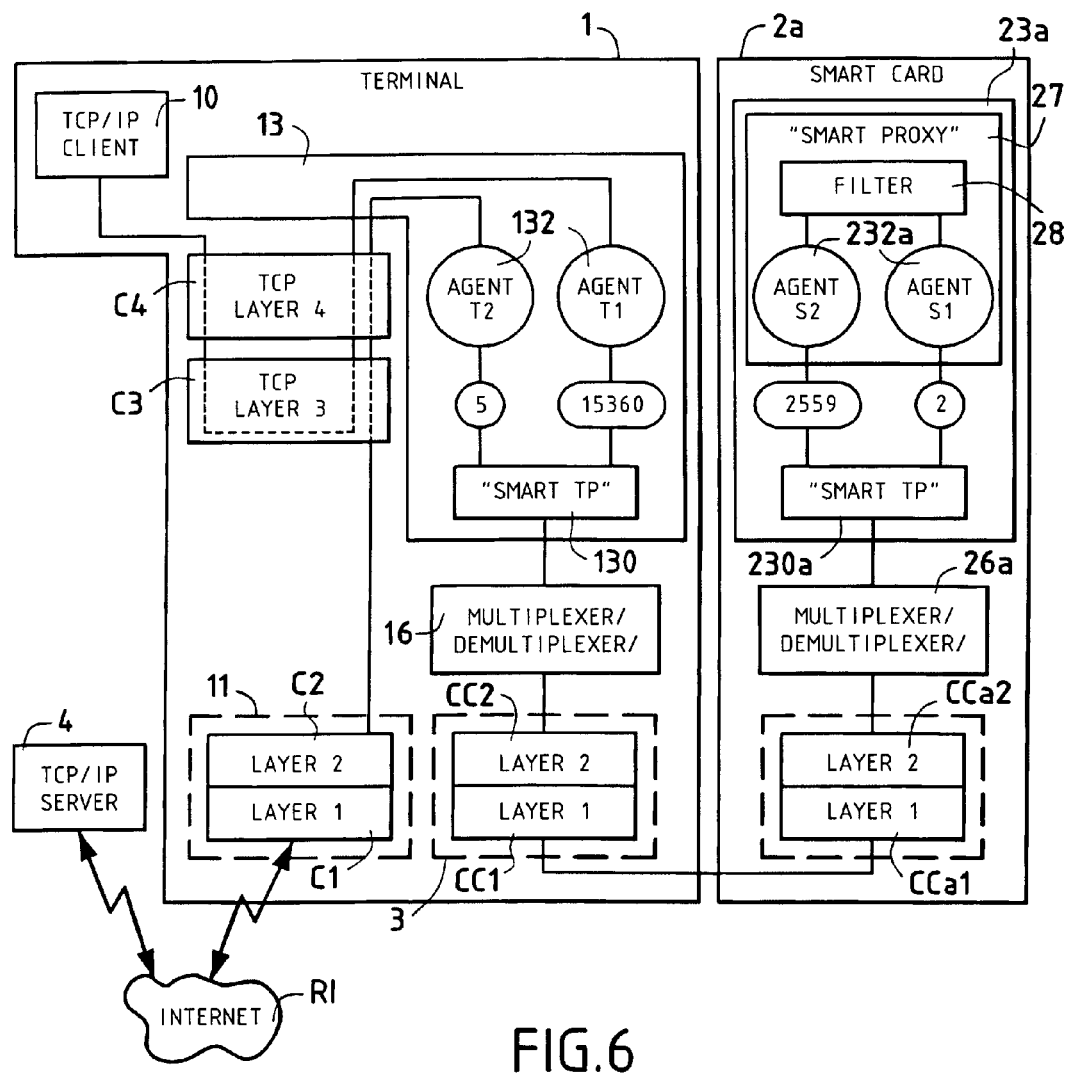
FIG. 6, in simplified fashion, illustrates the software architecture of a system according to the invention, in accordance with that of FIG. 4, in which a filter called a proxy is embodied in the smart card.

To define these terms, arbitrary reference numerals for various agents have been shown in FIG. 6: fixed numerals 2 and 5 for agents of the server type, that is, T$_2$ and S1, respectively, and variable or ephemeral numerals 15360 and 2559 for agents of the client type, that is, T$_1$ and S$_2$ respectively.

Particular examples of filters 28 will now be described in more detail.

EXAMPLE 1

Redirection Filter

A redirection filter assigns an http request to an external server (such as www.email.com) to a card URL, for instance the following URL:

$$(\text{http:}//127.0.0.1\text{:}8080/\text{eMail}) \qquad (3),$$

and this external server can for instance, by using the well known "POST http" method, serve to post identification data: login and a password, for example, that are assigned to a free e-mail server "email". The filter can also assure identification/authentication of the service user by more-certain challenge-based methods (these methods are described for example in the standard "http 1.1").

Typically, implementing a redirection filter includes the following steps:

1. The navigator 10 opens a connection with the network agent T$_1$ (IP address: 127.0.0.1:8080) and the session T$_1$-S$_1$ is opened with the web server of the card 2a;

2. The http request (in accordance with the recommendation "http 1.1 rfc 2068") is transmitted from the navigator 10 to the web agent S$_1$, which in turn, from the filename "/eMail", detects that a filter 28 is being called, in this particular case a redirection filter: from this moment on, all the data received by the network agent T$_1$ are processed by this particular filter 28;

3. An instance of a client agent S$_2$ is created by the filter 28;

4. S$_2$ opens a session with the network agent T$_2$, and the first pdu sent ("OPEN flag in place") includes the address and the port of the remote web server 4 (in this example, "www.email.com");

5. The agent T$_2$ opens a connection with the remote web server 4, and after it is open, a token is sent to the agent S$_2$;

6. The agent S$_2$ transmits an http request to the remote web server 4;

7. This server 4 typically sends a redirection header "http", which indicates the success of the operation, and furnishes a new connection URL to the navigator 10 along with a piece of software, known as a "cookie", that the navigator is to use;

8. The filter function 28 does not perform any processing on these data; and 9. The data are transmitted to the web navigator 10 via the session S$_1$-T$_1$.

When the navigator 10 receives the redirection header, it connects itself to the mailserver 4 with the appropriate cookie. In return, it typically receives a log-on page written in HTML.

EXAMPLE 2

"http-des" Filter

The case of an HTML page encoded by an algorithm of the DES type noted above will now be considered. This page, for example named "/yyy/content.html", is housed in a web server 4: "zzz.com:80". A filter function 28 located in the card (whose arbitrary name is "?des1") will perform a decryption algorithm, that is, an inverse function (or "DES$^{-1}$"), with a key associated with an index 1.

The following URL:

$$\text{http:}//\text{zzz.com/yyy/content.html} \qquad (4),$$

executed from a navigator 10, causes the loading of the file "content.html" from the server "zzz.com". Once the HTML page has been encoded, the flags <<html> and </html>>, used by the conventions of HTML to mark the beginning and end of the document, do not appear in the clear, and the navigator 10 will display either incoherent signs or an error indicating that an HTML page has not been received.

The following URL:

$$\text{http://127.0.0.1:8080/?des1=zzz.com:80/yyy/content.html} \quad (5)$$

tells the card to load the page:

$$\text{http://zzz.com:80/yyy/content.html} \quad (6)$$

through a filter 28 of the DES type, whose key index is 1.

Loading of the "content.html" page is done as follows:

1. The navigator 10 opens a connection with the network agent $T_1$ (IP address: 127.0.0.1:8080) and the session $T_1$-$S_1$ is opened with the web server of the card 2a;

2. The http request ("http 1.1 rfc 2068") is transmitted from the navigator 10 to the web agent $S_1$, and from the filename "/?des1=zzz.com.80/yyy/content.html", the web agent $S_1$ detects that a filter 28 is being called, in this particular case a filter 28 of the DES type (key with index 1): from this moment on, all the data received by the network agent $T_1$ are processed by this filter 28 of the DES type associated with the key with the index 1;

3. An instance of a client agent $S_2$ is created by the filter 28;

4. $S_2$ opens a session with the network agent $T_2$: the first pdu sent ("OPEN flag in place") includes the address and the port of the remote web server 4 ("zzz.com");

5. The agent $T_2$ opens a connection with the remote web server 4, and after it is open, a token is sent to the agent $S_2$;

6. The agent $S_2$ transmits an http request to the remote web server 4;

7. The remote server 4 sends a header "http", which indicates the nature of the file and transmits the file per se: these data are relayed to the function filter 28 via the session $T_2$-$S_2$;

8. The filter function 28 does not perform any processing on the header "http" and decrypts the HTML page.

9. The decrypted data are transmitted to the web navigator 10 via the session $S_1$-$T_1$.

The result of this operation is that the navigator 10 receives a decoded HTML page. The redirection operation can be automated by a script (typically in JAVA script language; JAVA is a registered trademark). For example, a script included in an HTML page (which will arbitrarily be called "content.html") redirects the URL:

$$\text{http://zzz.com/yyy/xcontent.html} \quad (7)$$

to $$\text{http://127.0.0.1:8080/?des1=zzz.com/yyy/content.html} \quad (8),$$

where xcontent.html and content.html are the arbitrary names of two HTML pages.

EXAMPLE 3

SSL Filter

The Secure Socket Layer protocol or SSL is widely used for web applications. It makes it possible to open "safeguarded tunnels" between a client (typically the navigator 10) and a server. SSL makes it possible to authenticate the server and assure the confidentiality and integrity of the data exchanged. To do so, a shared secret is constructed on the basis of a public key specific to the server. A session key is deduced from the shared secret and assures the encryption, for example, of information with the aid of an algorithm of the "triple DES" type. As is well known per se, a technique implementing authentication "certificates" is also used.

The importance of embodying an SSL filter directly in the smart card 2a is that the verification of the certificate of the public key of the server (which constitutes the essential point of systems with public keys) is done by the smart card, not by software residing in the terminal, which is considered less secure a priori. In the conventional way, once an SSL session is open, a user or "intenaut" (not shown) furnishes personal identification data, conventionally the association of a login and a password, which are entered in the clear at the terminal 1, using a keyboard (FIG. 1A: 6a). Another advantage of an SSL session done from the smart card 2a is that the login and the password are furnished by the smart card 2a, not by the user.

An SSL connection takes place as follows:

An HTML page that one wishes to obtain by an SSL session will now be considered. This page, named "/yyy/content.html", for example, is housed in a remote web server 4 (whose arbitrary name is "www.bank.com"). A particular filter function 28 located in the card (and arbitrarily called "?ssl1") embodies the SSL protocol and uses a login and a password associated with an index 1.

The following URL $$\text{http://127.0.0.1:8080/?ssl1=www.bank.com:80/yyy/content.html} \quad (9)$$

tells the smart card 2a to load the page "/yyy/content.html" using the SSL protocol.

Loading of the "content.html" page is done as follows:

1. The navigator 10 opens a connection with the network agent $T_1$ (IP address: 127.0.0.1:8080) and the session $T_1$-$S_1$ is opened with the web server of the card 2a;

2. The http request (conforming to "http 1.1 rfc 2068") is transmitted from the navigator 10 to the web agent $S_1$, and from the filename "/?ssl1=www.bank.com.80/yyy/content.html", the web agent $S_1$ detects that a filter function 28 is being called, in particular of the SSL type (with keys with an index 1): from this moment on, all the data received by the network agent $T_1$ are processed by the SSL filter 28;

3. An instance of a client agent $S_2$ is created by the filter 28;

4. $S_2$ opens a session with the network agent $T_2$: the first pdu sent ("OPEN flag in place") includes the address and the port (No. 443, in this example) of the remote SSL web server 4 ("www.bank.com:443");

5. The agent $T_2$ opens a connection with the remote web server 4, and after it is open, a token is sent to the agent $S_2$;

6. The filter 28 initiates a negotiation by the SSL protocol with the remote server 4 by means of the session $T_2$-$S_2$;

7. When an SSL is opened, the login and the password are transmitted by the filter 28 to the remote server 4, and the session $T_2$-$S_2$ is closed;

8. A new session $S_2$-$T_2$ is opened by the filter 28;

9. The filter 28 negotiates the resumption of the preceding SSL session;

10. The agent $S_2$ transmits an encrypted http request to the remote web server 4 to get the file "content.html";

11. The remote server 4 sends a header "http", which indicates the nature of the file and transmits the file per se: these data are relayed to the function filter 28 via the session $T_2$-$S_2$;

12. The filter function 28 decodes the data received and verifies their integrity; and 13. The decrypted data are transmitted to the web navigator 10 via the session $S_1$-$T_1$.

The result of this operation is that the navigator 10 receives a decoded HTML page. The redirection operation can be automated by a script (typically a JAVA script). For example, a script included in an HTML page (which will arbitrarily be called "content.html") redirects the URL:

http://127.0.0.1:8080/?ssl1=www.bank.com/yyy/content.html (10)

to http://www.bank.com/-yyy/xcontent.html (11).

An additional aspect of the invention will now be described, with which it is possible in particular to process multimedia data streams by a disymmetrical communication protocol.

When the terminal obtains multimedia data, for instance from the Internet RI, these data lose any nature of confidentiality they had and are memorized by a system that is generally less secure.

A Smart Proxy, embodied by one of the characteristics of the invention, thus constitutes a key device for the identification and authentication of the user of a particular service. The algorithms and keys are stored and executed inside the smart card 2a. Once a particular filter 28 has opened a TCP connection with a remote server 4, two cases can be contemplated:

A) fixed, secret keys are used to assure the integrity and confidentiality of the data: in this case, the data stream is decrypted and verified by the filter of the Smart Proxy; or, B) ephemeral keys, also called "session keys", are calculated when a connection is opened successfully between the filter 28 and the remote server 4: the second case is encountered in numerous security protocols used for the Internet, such as the aforementioned SSL protocol, or the IPSEC protocol.

When ephemeral session keys are used, calculation of algorithms by the smart card 2a is of no particular value, since in any case these keys will be used only a single time, and their sole purpose is to make it possible to transfer data in the clear to a less-secure terminal.

Sometimes, the connection with the server is disymmetrical from a standpoint of security. An identification and authentication procedure is secret, while the data exchanged subsequently have no confidential nature whatever. This leads to the notion of data streams that will hereinafter be called "critical"; the "critical stream" represents data that must be processed by the Smart Proxy in a secret way. Ephemeral session keys (which sometimes vary during a single connection) can be deduced from the critical stream and implemented by the terminal 1 without any particular security measures.

A distinction will accordingly be made hereinafter between the critical stream, which designates the data stream that has to be processed by the Smart Proxy, from an "opaque" data stream that can be processed on a nonsecure terminal.

In the context of pdus (command pdus) identified by a particular value of flag field, make it possible to transmit commands to the agents. These commands are processed by the agent addressed per se and are not transmitted to any other agent or to the network RI.

Within this context, although the mechanism of agents specific to the invention is employed, data exchanges can take place outside a session.

Two agents can in fact exchange a certain quantity of data without being connected via a session. A particular command pdu tells a first agent, arbitrarily called $A_1$, what quantity of data $Q_1$ it should output (outside a source reference field, target reference and flag), and another pdu tells a second agent, arbitrarily called $A_2$, the quantity of data $Q_2$ sent from agent $A_1$ that it is also authorized to receive. The pdus that include the "CLOSE" flag are not transmitted outside a session.

The paths of the critical and opaque streams, respectively, are as follows:

The critical stream contains secret information, which must be processed by the filter 28 assigned to the Smart Proxy and must accordingly necessarily travel via the smart card 2a. The opaque stream can be processed solely by the agents located in the terminal 1, using a mechanism for data exchange outside a session, for instance.

The opaque stream can be safeguarded by the critical stream.

A global data stream can generally be broken down into a critical stream and an opaque stream, which makes it possible for example to decrypt a high-speed stream (representing multimedia data per se, for instance) by way of a critical stream of less amplitude.

The arrangements specific to the invention make it possible to process such a high-speed multimedia data stream by organizing disymmetrical communication and data processing protocols.

EXAMPLE 4

Disymmetrical Redirection Filter

A "card" URL of the type:

http://127.0.0.1:8080/?f1=/www.host.com/oneFile (12)

is assigned an http request to an external server 4, such as:

http://www.host.com/oneFile (13)

by a disymmetrical redirection filter.

The connection with the server 4, which includes a phase of identification and authentication (a challenge-based mechanism, for instance), is managed by the filter 28, which will arbitrarily be called "?f1" that is assigned to the Smart Proxy 27. The filter 28 is called disymmetrical, because once the authentication has been done, the data exchanged with the server 4 are not encrypted and no longer pass through the filter 28.

Figure 7:
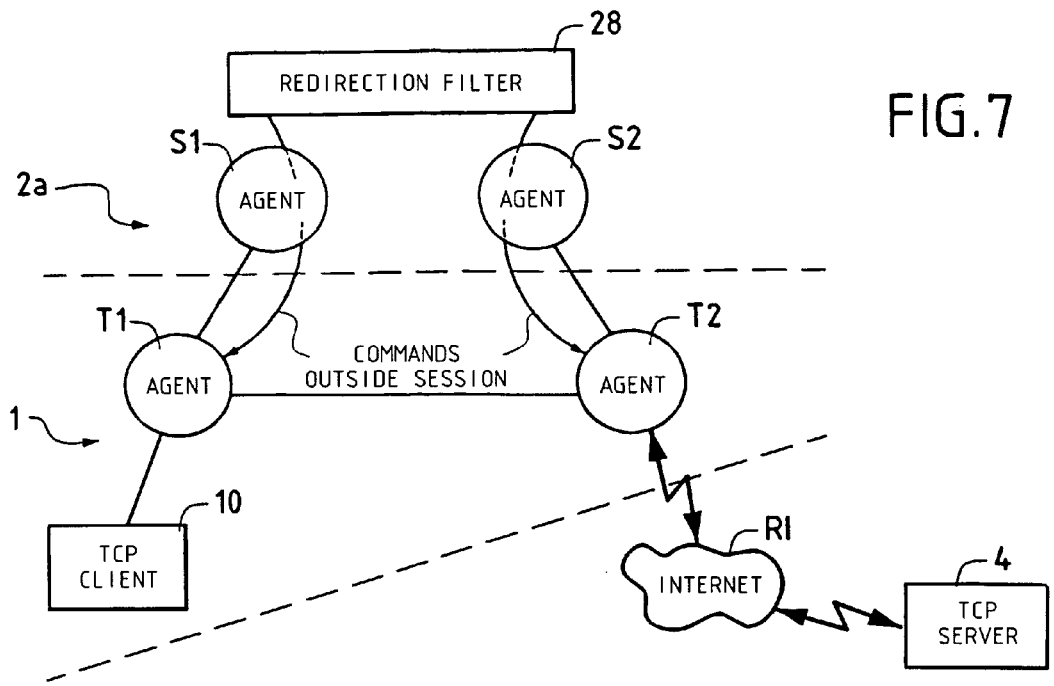
FIG. 7 is a schematic diagram illustrating a first exemplary embodiment of a disymmetrical filter (or "redirection" filter) in an architecture according to the invention, of the type shown in FIG. 6.

The steps for implementing a disymmetrical redirection filter 28, illustrated schematically by the diagram in FIG. 7 (which in a simplified way shows the architecture according to the invention of the system of FIG. 6), are as follows:

1. The navigator 10 opens a connection with the network agent $T_1$ (IP address: 127.0.0.1:8080) and the session $T_1$-$S_1$ is opened with the web server of the card 2a;

2. An http request is transmitted from the navigator 10 to the web agent $S_1$, and from the filename "/?f1=www.host.com/oneFile", the web agent $S_1$ detects that a particular redirection filter 28 is being called: from this moment on, all the data received by the network agent $T_1$ are processed by this filter 28;

3. An instance of a client agent $S_2$ is created by the filter 28;

4. $S_2$ opens a session with the network agent $T_2$: the first pdu sent ("OPEN flag in place") includes the address and the port of the remote web server 4 ("www.host.com");

5. The agent $T_2$ opens a connection with the remote web server 4, and after it is open, a token is sent to the agent $S_2$;

6. An authentication procedure takes place between the filter 28 "?f1" and the remote server 4, and the data are exchanged by the session $S_2$-$T_2$;

7. If this procedure is successful, the filter 28 sends a command pdu to the agent $T_1$, which authorizes it to receive all the data sent outside a session by the agent $T_2$, and sends a command pdu to the network agent $T_2$ which tells it to transmit all the data received from the network to the agent $T_1$: the data originating in the remote server 4 are relayed, via the agents $T_2$ and $T_1$, to the navigator 10 and hence no longer pass through the smart card 2$a$; and 8. When a TCP disconnection occurs (at the command of the server 4), one of the agents, $T_1$ or $T_2$, outputs a pdu with a flag in the "CLOSE" state to one of the agents $S_1$ or $S_2$, and the filter 28 then supervises the closing of the sessions $T_1$-$S_1$ and $T_2$-$S_2$.

EXAMPLE 5

Disymmetrical SSL Filter

Figure 8:
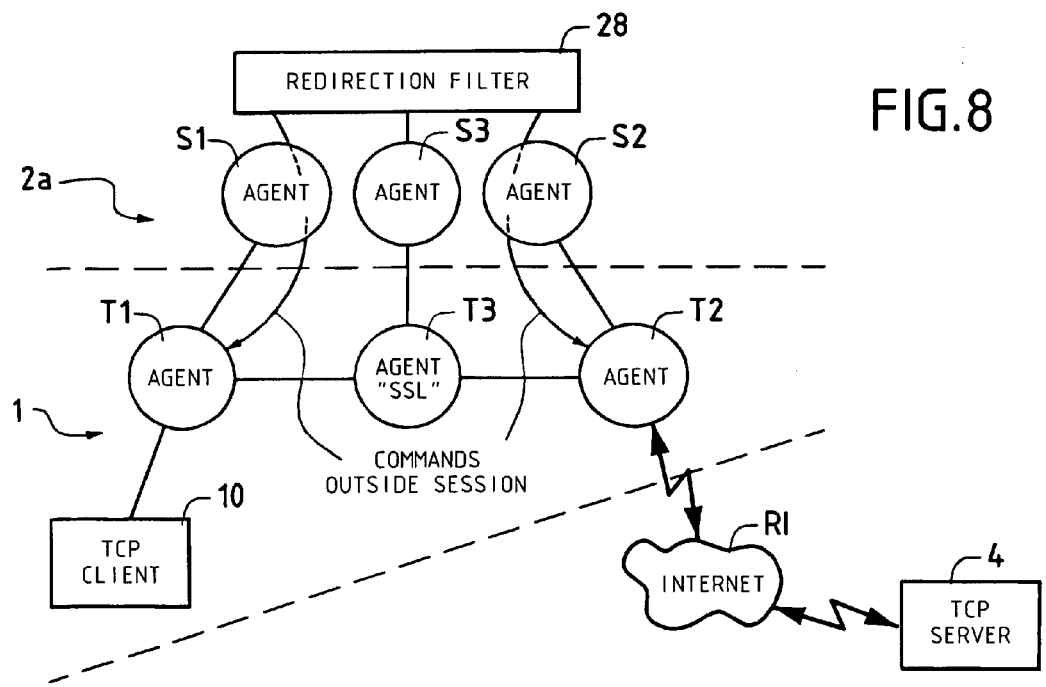
FIG. 8 is a schematic diagram illustrating a second exemplary embodiment of a disymmetrical filter (or SSL) in an architecture according to the invention, of the type shown in FIG. 6.

This example is schematically illustrated by the diagram in FIG. 8, which in simplified fashion shows the essentials of the architecture according to the invention of the system of FIG. 6.

As has been described above in Example 3, an SSL filter can be activated by means of a card URL (such as that in statement (11)). In such a protocol, the critical data stream is used to select a pair of entities, which includes an encryption algorithm and a monodirectional hash function, as well as a certain number of associated parameters (keys and the current value of the hash function). Once a phase of negotiation has been completed, the execution of these algorithms in the smart card 2$a$ is of no particular importance, since the data are directed from the Internet RI to the terminal 1 in the clear.

An additional agent $T_3$ (of the server type) to which an SSL function has been assigned can now advantageously be used. This agent $T_3$ is located in the terminal 1. Once the parameters of the SSL session have been negotiated, the SSL filter 28 opens a session between an additional client agent $S_3$ (in the smart card 2$a$) and the SSL server agent $T_3$ (in the terminal). When the session is opened, the agent $T_3$ is initialized with values of DES keys and ongoing parameters of the hash function. The SSL filter 28 sends a command pdu to the agent $T_2$, which enables it to resend the data output outside the session by $T_3$ to the network RI and to redirect the data received from the network to $T_3$. The SSL filter 28 sends a command pdu to the agent $T_3$ to enable it, outside a session, to receive the data output by $T_1$ and $T_2$. The SSL filter sends a command pdu to the agent $T_1$, which enables it to resend the data output outside a session by $T_3$ to the network RI and to redirect the data received from this network RI to $T_3$. A "tunnel" outside a session is thus established between $T_1$-$T_2$-$T_3$ in the terminal 1. When an agent $T_1$ or $T_2$ closes the session assigned to it, the filter 28 proceeds to close the other two remaining sessions.

Disymmetrical Filter, in General

More generally, and returning again to one or the other of the diagrams in FIG. 7 or 8, the steps in the method implementing a disymmetrical filter 28 are as follows:

A Smart Proxy 27 (FIG. 6) is embodied on the basis of a card URL by means of two sessions $T_1$-$S_1$ and $T_2$-$S_2$. The particular filter 28 to be embodied is determined on the basis of this URL. In a first time period, the filter 28 controls the data stream between the TCP client (navigator 10) and the remote server 4. At the end of an authentication and negotiation phase, a set of security parameters is obtained. This consists of a critical data stream.

The filter 28 then opens a session with a security agent ($T_3$, for example), which performs the negotiated protocol with a set of parameters defined by the filter 28 at the time the session was opened. The filter 28 creates a tunnel $T_1$-$T_2$-$T_3$ for transferring data outside a session. For example, a predetermined quantity of data is transmitted outside a band by the chain $T_1$-$T_2$-$T_3$. In other words, the opaque data stream is processed by the set $T_1$-$T_2$-$T_3$ and accordingly does not pass via the smart card 2$a$. The critical data can be identified by various methods: periodically fixed length of opaque data, marks in a TCP packet by means of an urgent data pointer, and so forth. These methods are known per se. The critical data, in contrast to the opaque data, are transmitted by agents $T_1$ or $T_2$ of the terminal 1 to the filter 28. This filter consequently, by means of a command pdu, modifies the functional parameters of the agent $T_3$. When an agent, $T_1$ or $T_2$ of the terminal 1 closes the session that is assigned to it, the filter 28 proceeds to close the other two remaining sessions.

Also in general, the opaque data stream, aside from any aspect associated with security, can undergo various transformations, performed for example by an additional agent similar to the agent $T_3$. The term "security" must be understood in its most general sense: confidentiality, authorization, application of a seal or signature, especially by using "certificates", etc.

In this case, as above, the filter 28 can consequently modify the parameters of the agent $T_3$, by using a particular pdu.

To define the concepts and by way of nonlimiting example, this can pertain to a format conversion. In the case of audio data, opaque data, for instance transmitted and coded by the MP3 format could be converted to the wav format or any other format accepted by the terminal 1. The same is true for video data; opaque data received in the MPEG format could be converted to the avi format or any other format accepted by the terminal 1.

In all cases, only a low-volume, low-speed data stream, comprising what are called the critical data, pass through the smart card 2$a$. Only these data are necessary for selecting an appropriate filter, which will subsequently control the passage of opaque stream data in the terminal and their processing, via the agents $T_1$ and $T_2$ and optionally $T_3$.

In other words, thanks to the specific arrangements of the invention that convert the smart card into a client/web server on the one hand, and that on the other make it possible to embody a proxy directly in it, the smart card becomes capable of delegating the processing of an information stream of fixed quantity to the terminal to which it is connected. It follows that global streams, which are at very high speed, can also be processed by a smart card terminal, thanks to the implementation of disymmetrical communication protocols, all the while preserving a maximum degree of safeguarding. This high degree of safeguarding is due to the fact that the essential operations of encryption and/or authentication remain under the exclusive control of the smart card, with the critical data passing through it.

From reading the above description, it can easily be confirmed that the invention indeed successfully achieves the objects assigned to it.

However, it must be clear that the invention is not limited to the sole exemplary embodiments described above, in particular in conjunction with FIGS. 2–4, on the one hand, and 6–8, on the other.

It must also be clear that the process described is reversible: transmissions between a server and the terminal can be done in both directions. In fact, the terminal can also transmit a file at high speed to the remote server, still under the control of the smart card. In this case, the data called critical data are furnished to the smart card by the terminal, after an optional phase of negotiation with the remote server.

Finally, although the method has been described in detail in terms of the transmission of a safeguarded multimedia data stream at high speed, the method according to the invention, as has already been noted above, is in no way limited to this particular application.

The invention also relates to a method for transmitting a data stream, via a network of the Internet type, between at least one remote server and a terminal provided with a smart card reader, said terminal including information processing means and information storage means, the information storage means including at least one application of the client TCP/IP type, the card including information processing means and information storage means, said terminal and said server both being connected to said Internet-type network, characterized in that it includes at least the following phases:

a) a first phase, comprising implanting a first piece of software (23a), forming a specific communication protocol layer, into the information processing means and information storage means of said smart card (2a);

b) a second phase, consisting of implanting a second piece of software (13), forming a specific communication protocol layer and forming an interface with at least said application (10) of the TCP/IP type, into the information processing means and information storage means said terminal (1);

that said first and second pieces of software (13, 23a) each furthermore include at least one first autonomous software entity ($T_2$, $S_1$) of the client type and one second autonomous software entity ($T_1$, $S_2$) of the server type, said entities ($T_1$, $S_1$, $T_2$, $S_2$) cooperating, thanks to the information processing means and information storage means, in such a way as to enable the establishment of bidirectional data exchange sessions between said terminal (1) and said smart card (2a) and in such a way that said smart card (2a) offers the functions of a client/web server, and to enable the establishment of a bidirectional data exchange session between said terminal (1) and one of said remote servers (4), via said Internet-type network (RI), said autonomous software entities communicating by means of predetermined protocol data units;

that it includes a phase of embodying, in the information storage means of said smart card (2a), a piece of applications software of predetermined functional characteristics known as a filter (28), receiving and/or outputting protocol data units to and/or from said first and second autonomous software entities ($S_2$, $S_1$) of the client and server types, respectively, that are included in said second specific piece of software (23a), thanks to the information processing means and information storage means, the embodiment of said piece of applications software piece being under the control of said server-type autonomous software entity ($S_1$);

and that said filter (28) cooperates with said autonomous software entities ($S_2$, $S_1$) of said second specific piece of software (23a) to open a session with said autonomous software entities ($T_2$, $T_1$) of said first specific piece of software (13) in order to modify the predetermined characteristics of said data stream transmitted between said terminal (1) and said remote server (4).

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method for transmitting a data stream, via a network, between at least one remote server and a terminal provided with a smart card reader, said terminal including at least one client TCP/IP application, said terminal and said server both being connected to said network, said method comprising:

a) implementing a first item of software, forming a first specific communication protocol layer, into said smart card; and b) implementing a second piece of software, forming a second specific communication protocol layer and forming an interface with at least said application, in said terminal;

where said first and second items of software each include at least one first client-based autonomous software module and one second server-based autonomous software module, said first and second modules cooperating in such a way as to establish bidirectional data exchange sessions between said terminal and said smart card and in such a way that said smart card offers functions of a client/web server, and to establish a bidirectional data exchange session between said terminal and one of said remote servers, via said network, said first and second autonomous software modules communicating by means of predetermined protocol data units;

wherein said method further includes:

embodying in said smart card a filter comprising applications software having predetermined functional characteristics, receiving and/or outputting protocol data units to and/or from said first and second autonomous software modules, respectively, that are included in said second item of software, an embodiment of said applications software being under control of said second autonomous software module; and wherein said filter cooperates with said autonomous software modules of said second item of software to open a session with said autonomous software modules of said first item of software in order to modify predetermined characteristics of said data stream transmitted between said terminal and said remote server.

2. The method of claim 1, wherein said first and second autonomous software modules comprise intelligent agents.

3. The method of claim 2, wherein each of said intelligent agents is assigned at least one of the six following properties:

"host": intelligent agent located in said terminal;

"card": intelligent agent located in said smart card;

"local": intelligent agent not communicating with said network (RI);

"network": intelligent agent communicating with said network (RI);

"client": intelligent agent that initializes one of said sessions; and

"server": intelligent agent which receives a request for one of said sessions.

4. The method of claim 3, wherein said intelligent agents are identified by identifiers including whole numbers,
wherein said "server"intelligent agents of the server type ($T_2$, $S_1$) are assigned said "server" characteristic and are identified by a fixed reference numeral or symbol,
wherein said "client" intelligent agents of the client type ($T_1$, $S_2$) are assigned said "client" characteristic and are identified by a variable reference numeral or symbol, which changes from one of said sessions to a next, and
wherein client-based instances of said intelligent agents of the client type are created at the time of these sessions.

5. The method of claim 4, wherein said protocol data units include one of said identifiers, an entity called a flag that specifies its nature, and optional data exchanged between said intelligent agents.

6. The method of claim 5, wherein said flags can assume at least one of the three following states:
"OPEN"—indicating the opening of one of said sessions;
"CLOSE"—indicating the closure of one of said sessions; and
"BLOCK"—indicating that one of said intelligent agents is waiting for a response from a corresponding intelligent agent and remains inactive;
and that said sessions can assume the following three states:
"disconnected"—when no session is open between one of said intelligent agents and any other of said intelligent agents;
"connected"—when one session is open with another of said intelligent agents, a session being identified by a pair of set identifiers; and
"blocked"—when one of said intelligent agents is connected and is waiting for a response from one of said intelligent agents with which it is connected.

7. The method of claim 6, wherein the steps of establishing one of said sessions between two of said intelligent agents includes the following:
creating a new instance of one of said client-based intelligent agents;
said new instance of one of said client-based intelligent agents being identified by one of said variable reference numerals or symbols called ephemera;
outputting one of said protocol data units to one of said server based agents, identified by a predetermined fixed reference numeral or symbol, with a flag in place at said "OPEN" state;
shifting said client based intelligent agent to a connected state or a blocked state depending on a value of said flag "BLOCK"; and
receiving by said server based intelligent agent said protocol data unit with the flag in place at said "OPEN" state and shifting to said connected state;
wherein after the opening of said session, said two connected intelligent agents exchange data via said protocol data units.

8. The method of claim 7, wherein the steps of closing one of said sessions between two said intelligent agents includes the following:
a) outputting, via one of said client based intelligent agents of one of said protocol data units with a flag in said "CLOSE" state, and optionally including data; and
b) receiving, via said server based connected intelligent agent, said protocol data unit and shifting of said session to said disconnected state.

9. The method of claim 8, wherein said TCP/IP application present in said server includes a web-type navigator.

10. The method of claim 9, wherein said first item of software includes a first intelligent agent assigned said "network", "client" and "terminal" properties, known as $T_1$, performing the function of a TCP/IP server, and that said second item of software includes a first intelligent agent assigned said "card", "server" and "local" properties, called $S_1$, this agent $S_1$ being associated with said first intelligent agent $T_1$ via a session, and that said predetermined functional characteristics of said filter are a function of information originating in said first intelligent agent $T_1$, that said first item of software includes a second intelligent agent assigned said "terminal","server" and "network" properties, called $T_2$, performing the function of a TCP/IP client, in order to be connected to said remote server via said network, and that said second item of software includes a second intelligent agent assigned said "card", "client" and "local" properties, called $S_2$, an instance of said intelligent agent $S_2$ being created at each of said sessions dynamically by said filter and said agent $S_2$ opening sessions with said second intelligent agent $T_2$ and forwarding it an address enabling connection to said remote server, in such a manner that said intelligent agents and said filter cooperate to form a function known as "proxy TCP" and control the exchanges of data between said remote server and said client.

11. The method of claim 10, wherein creation of said proxy TCP function includes the following steps:
opening a connection between said client and a first server type intelligent agent $T_1$, transmitting said web-type navigator of a predetermined IP address of a URL bringing about a feedback loop to said smart card and a creation of a session between said first server type intelligent agent $T_1$, and a first client type intelligent agent $S_1$, said IP address of the URL encapsulating another IP address of the URL identifying a path leading to an entity included in said remote server; determining, from protocol data units exchanged during said session between said server and client type intelligent agents $T_1$ and $S_1$ a predetermined filter function and creation of said filter;
creating by said filter an instance of a second server type intelligent agent $S_2$ and opening of a session between said second server type intelligent agents $S_2$ and a second client type intelligent agent $T_2$, and transmitting, via a first protocol data unit, data carrying said encapsulated IP address, the data specifying the name of said remote server and an assigned port number;
via said second client type intelligent agent $T_2$, opening a TCP-type connection with said remote server via said network; and
subsequent controlling of the data output by said server-based and client-based intelligent agents $T_1$ and $T_2$ in such a way as to perform a predetermined processing on the data exchanged between said remote server and said web-type navigator.

12. The method of claim 11, wherein said protocol data units are called "command" protocol data units and identified by a flag of a particular value, that said command protocol data units are processed directly by said target intelligent agents without being transmitted to other intelligent agents or to said network, and that said command protocol data units indicate to a first intelligent agent a quantity of data to be output and indicate to a second agent a quantity of data which it is authorized to receive from the first intelligent agent, in such a way as to enable exchanges of data between intelligent agents outside said sessions.

13. The method of claim 12, wherein said data stream is a composite stream, including critical data derived from said smart card in order to undergo a first predetermined processing, and opaque data to be transmitted directly to said terminal, said opaque data undergoing a second predetermined processing in said terminal under the control of said critical data acting on said filter.

14. The method of claim 13, wherein said second processing of said opaque data is performed at the time of data exchanges outside said sessions between intelligent agents.

15. The method of claim 14, wherein said data stream transmission between said web-type navigator and said remote server is done by a disymmetrical communication protocol, and that it includes at least the following successive steps:

a) opening a connection between said web-type navigator and said intelligent agent $T_1$ and transmission by said web-type navigator of a predetermined IP address of the URL causing a feedback loop to said smart card, and the creation of a session between said intelligent agent $T_1$ and said intelligent agent $S_1$, said IP address of the URL encapsulating another IP address of the URL identifying a path leading to an entity included in said remote server;

b) determining, from protocol data units exchanged during said session between said intelligent agents $T_1$ and $S_1$ of a predetermined filter function and creation of said filter;

c) creating by said filter an instance of said intelligent agent $S_2$ and opening a session between said intelligent agents $S_2$ and $T_2$, and transmitting, via a first protocol data unit, data carrying said encapsulated IP address, the data specifying the name of said remote server and an assigned port number, and transmitting a http request to said remote server;

d) exchanging particular critical data between said remote server and said filter by way of said open session between said intelligent agents $S_2$ and $T_2$;

e) as a function of a predetermined result of a processing of said particular critical data by said filter, sending a command protocol data unit to said intelligent agent $T_2$ authorizing reception of data output outside a session with said agent $T_1$ the data subsequently exchanged between said remote server and said web-type navigator (10) constituting said opaque data and being relayed directly by said intelligent agents $T_1$ and $T_2$ without passing through said smart card; and f) when a TCP disconnect order is detected, outputting by one of said intelligent agents $T_1$ or $T_2$ of a protocol data unit associated with a flag in said "CLOSE" state in the direction of one of said intelligent agents $S_1$ or $S_2$ in such a way that said filter supervises a closure of said sessions between said intelligent agents $T_1$ and $S_1$ on the one hand and said intelligent agents $T_2$ and $S_2$, on the other.

16. The method of claim 15, wherein said exchanging of particular critical data step includes an authentication procedure effected between said filter and said remote server, and that said predetermined result of said step (e) is the verification that said authentication procedure has taken place properly.

17. The method of claim 16, wherein said filter is a filter for implementing said safeguarding protocol SSL, that a first additional server-based intelligent agent is assigned a SSL function and called $T_3$, which is included in said first item of software, and a second additional client-based intelligent agent, called $S_2$, included in said second item of software, and includes said steps a) through d) in such a way as to initiate a negotiation with said remote server and to select a pair of security data consisting an encryption algorithm and a monodirectional hash function, and parameters associated with these security data, and subsequently to perform the following steps:

1) opening a session between said agents $S_3$ and $T_3$, the latter being initialized with an encryption key value and current values of said hash function;

2) via said filter, sending said intelligent agent $T_2$ one of said command protocol data units, enabling transmission to said remote server, via said network, data output outside a session with said intelligent agent $T_3$ and to redirect the data received from the Internet-type network (RI) to said intelligent agent $T_3$;

3) via said filter, sending said intelligent agent $T_3$ one said command protocol data unit, enabling it to receive data output outside a session with said intelligent agents $T_1$ and $T_2$;

4) establishing a transmission tunnel in said terminal, through said intelligent agents $T_1$ $T_3$ and $T_2$; and 5) when a session assigned to it is closed by one of said intelligent agents $T_1$ or $T_2$, closure by said filter of other sessions that have remained open.

* * * * *

UNITED STATES PATENT AND TRADEMARK OFFICE
CERTIFICATE OF CORRECTION

PATENT NO. : 7,130,910 B2  Page 1 of 1
APPLICATION NO. : 09/958725
DATED : October 31, 2006
INVENTOR(S) : Pascal Urien It is certified that error appears in the above-identified patent and that said Letters Patent is hereby corrected as shown below:

Column 22, Line 22, replace "piece" with -- item --.

Signed and Sealed this

Twentieth Day of March, 2007

JON W. DUDAS
*Director of the United States Patent and Trademark Office*